United States Patent Office 3,464,906
Patented Sept. 2, 1969

3,464,906
ELECTRODEPOSITION OF ZINC PARTICLES
Maurice Alexander Ridley, Durham, and Peter John Robinson, Gateshead, England, assignors to Durham Chemicals Limited, Birtley, England, a British company
No Drawing. Filed Mar. 8, 1967, Ser. No. 621,456
Claims priority, application Great Britain, Mar. 9, 1966, 10,417/66
Int. Cl. C23b *13/00;* B01k *5/02*
U.S. Cl. 204—181          20 Claims

ABSTRACT OF THE DISCLOSURE

Zinc paint can be deposited electrophoretically provided the zinc pigment is in the form of flakes of particle size below 60 microns, preferably of specific surface 0.5–3.3 m.$^2$/g., and carrying a largely non-polar coating, e.g. of stearic acid. Aluminium flake similarly coated and of particle size below 150 microns may also be present, as may an extending high resistance pigment, preferably coated rutile. The coated substrate may be given a further coating of zinc or another metal electrolytically, or of a higher resistance pigment (in a binder) electrophoretically.

---

This invention relates to the formation on metal substrates of protective coatings of metallic paints.

It has long been known to form on steel substrates protective coatings of paints comprising a metallic pigment, usually zinc or aluminium dust, or mixtures thereof, in a binder such as an epoxy resin. Such paints are conventionally applied by dipping or spraying.

It has now been found that zinc paints suitable for electro-deposition can be formulated provided the zinc particles are in a specific form and have their surface protected by a non-polar or largely non-polar material. (By "largely non-polar" is meant that the greater part of the molecule is essentially non-polar, even though the molecule as a whole may be polarised by the presence of one or a relatively small number of polar groups, such, for example, as carboxyl groups.)

In one aspect the invention comprises the formation of a zinc coating on a metal substrate by electro-deposition from an aqueous suspension of a zinc pigment containing also a binder, in which the zinc pigment consists of zinc flake in which the individual particles have a surface coating of a water-insoluble non-polar or largely non-polar material (as hereinbefore defined). The invention comprises also coated products obtained by this method, and aqueous suspensions of the zinc flake from which the coatings can be formed.

By zinc flake is meant finely divided zinc leaf of particle size below 60 microns, preferably of specific surface area of 0.5–3.3 m.$^2$/g. especially 0.8–2.2 m.$^2$/g. Zinc flake is commercially available, and its production by milling atomized zinc in the presence of a liquid hydrocarbon dispersing agent and a lubricant, e.g. stearic acid, is described in British Patent No. 846,903. The zinc is preferably substantially pure, but it may be in the form of a binary alloy, e.g. an alloy with magnesium, containing for example 90% zinc and 10% magnesium, as described in British Patent No. 846,904. If desired the zinc flake can be partly replaced by aluminium flake, i.e. leafing aluminium pigment of particle size below 150 microns in which the flake particles carry a similar non-polar or largely non-polar coating. (Throughout this specification all "parts" and proportions are by weight.)

It has been found to be possible, by the process of the invention, to produce on a steel substrate a coating of a zinc paint which gives a useful degree of galvanic protection and also has the very uniform thickness, even at sharp edges and corners, which is characteristic of electro-deposited paint coatings. This was surprising in view of the fact that up till now it has not been regarded as practicable to use the electro-deposition method with metallic zinc paints.

While we do not wish to be bound by any particular theory, it seems likely that at least the primary effect of the non-polar or largely non-polar coating is to protect the zinc particles from rapid chemical reaction with the aqueous medium in which the pigment is used. For the sake of brevity therefor this will sometimes be termed simply the "protective coating" or "protective material."

The protective material may, for example, be a solid hydrocarbon or hydrocarbon derivative having fatty or waxy properties. Thus it may be an aliphatic hydrocarbon having 20 or more carbon atoms, or a normally solid alcohol, acid or ester derived from a long-chain aliphatic hydrocarbon, e.g. lauric acid and its higher homologues, and corresponding alcohols or esters which melt at temperatures above that to be employed for the electro-deposition. Of such compounds stearic, myristic, palmitic and oleic acids, especially the first, are particularly effective and are preferred. Mixtures of such compounds can also be used.

It is usually preferred to form a coating of the protective material on the zinc particles before the paint is formulated. This can be done in any desired way, e.g. by grinding the zinc in the presence of the protective material and if desired a liquid grinding medium. However, in the zinc flake at present available commercially, the particles already carry a large non-polar coating, usually of stearic acid, as a result of the method by which they are made, so that there is no need to subject them to a separate operation to form such a coating.

While it is possible to add the protective material to the dispersing medium employed in the paint separately from the pigment, this course is not recommended.

The pigment is suspended or dispersed in an aqueous medium which also contains a water-soluble resin or a dispersed resin to act as binder. The aqueous medium may also contain other adjuvants, as more fully explained below, including usually a small amount of a base to bring its pH to a suitable value as required by the particular binder employed. Other things being equal the higher pH levels are to be preferred, as under such conditions the zinc is more resistant to attack by the water. Preferably an amine base such, for example, as triethylamine is used. As is usual in electro-deposition methods, the composition will be considerably more dilute than is normal in other methods of applying the paint; for example solids contents between 5 and 20%, and especially 7–15%, are suitable.

As the binder it is preferred to use a water-soluble resin, for example a water-soluble modified alkyd or amine resin (aminoplast), or a water-soluble epoxy ester of a polymeric fatty acid. This last type is especially useful as appropriate examples can be employed at relatively high pH, e.g. about 10. All these water-soluble resins are well known and commercially available, though their precise structure and composition are usually kept secret by the manufacturers.

It has been found that the binder is usually deposited more rapidly than the zinc (or than the zinc and aluminium, if both are employed), so that the weight ratio metal:binder in the coating formed is generally lower than that in the aqueous suspension of the zinc flake. Generally speaking, the weight ratio metal:binder in the suspension may be between 1:1 and 3:1, ratios between 1.5:1 and 2.5:1 being generally preferred.

In making the aqueous dispersions it is greatly preferred to form a pre-dispersion of the coated metal flake in an organic dispersing medium which will usually contain a surfactant, especially a non-ionic surfactant, and subsequently to mix the resin and water with the pre-dispersion. By this means it is possible to reduce the tendency of the zinc, or zinc and aluminium, particles to settle out of the aqueous suspension during the formation of the coating.

As the dispersing medium for such pre-dispersion it is preferred to use a hydrocarbon or other liquid of very low polarity, e.g. a petroleum fraction boiling between about 150° and 210° C., an aromatic hydrocarbon or hydrocarbon mixture, or one or more chlorinated hydrocarbons of similar volatility.

Examples of suitable non-ionic surfactants include the well known condensation products of olefine oxides, especially ethylene oxide, with fatty alcohols or alkyl-substituted phenols. Others are known however, and can also be used.

The pre-dispersion may be made by mixing the zinc flake, and aluminium flake if this is also to be present, with the dispersing medium and surfactant. It is preferred to keep the proportion of dispersing medium as low as is consistent with the formation of a uniform dispersion, proportions between about 25 and 50% being generally satisfactory; the best proportion for any particular formulation can easily be formed by routine testing.

The resin is mixed with the pre-dispersed zinc flake, preferably with a small quantity of water, and the resulting mixture eventually diluted with more water to the operating consistency, for instance to a solids content of about 10%. De-ionised or distilled water or water of an equivalent degree of purity is preferably used.

The protection against corrosion afforded by a paint containing a relatively low proportion of zinc can be increased by adding an inert extender pigment. The use of such an extender in the process of the invention, by making possible a higher total pigmentation level, gives superior corrosion protection. Moreover certain extenders impart a higher electrical resistance to the paint film. This is a further advantage, since the higher the electrical resistance of the paint film during the deposition, the greater the mount of zinc that can be deposited satisfactorily. Certain titanium dioxides, such as coated rutile grades, are particularly useful, but other high resistance pigments can be used, for example china clay, zinc oxide or barytes (though the high density of barytes can give rise to difficulties due to settling). (The coated rutile pigments are of rutile having a coating of, for example, mixed oxides of zinc, aluminium and silicon. The weight of the coating may be about 3% of that of the pigment.) Since such extenders are usually deposited more rapidly than the zinc flake, the aqueous suspension can contain a relatively small proportion thereof, say 5-15% of the total weight of metal flake, binder and extender. Furthermore, the voltage used in the electro-deposition operation is usually best kept relatively low, so as to keep the difference in deposition rates as low as possible. When the preferred pre-dispersion method of forming the aqueous suspension is adopted, the extender is preferably incorporated in the pre-dispersion.

The aqueous suspension can also contain other adjuvants which do not interfere with the process, and it is especially advantageous to have present a suspending agent, e.g. a non-ionising water-soluble cellulose ether such as methyl cellulose or ethyl hydroxyethyl cellulose. Such adjuvants can be added at any stage down to the final dilution, but again are advantageously incorporated in the pre-dispersion.

The aqueous medium can if desired contain a small proportion of a water-miscible organic solvent, e.g. an alcohol, and this is sometimes advantageous; however care should be taken to avoid using enough of such solvent to decrease significantly the protection given to the zinc particles by the protective coating.

The invention is not restricted to the use of any particular electro-deposition technique. Preferably however the constant voltage technique is employed, using a D.C. voltage. The voltage employed will be chosen in accordance with the composition of the aqueous dispersion and the nature of the product desired, and in particular with the metal content which is required in the coating formed. Generally voltages between about 10 and 130 volts can be used, a range of 50–80 volts being preferred when the zinc (and any aluminium) are substantially the only pigments used, or lower, down to 20 or even 15 volts, generally between 15 and 40 volts, when a high resistance extender such as titanium dioxide is also employed. The current density may for example be 2–5 amperes/sq. foot. Advantageously the aqueous suspension is stirred or otherwise agitated as necessary to prevent excessive settling during the operation. The cathode may be contained in its own compartment, which is separated from the anodic or painting compartment by a semi-permeable membrane, or may be in the same compartment as the anode. For instance the vessel containing the aqueous suspension may itself form the cathode. The painting may be performed on an individual or a continuous basis, with an immersion time usually between 1 and 5 minutes; in continuous operation the articles to be painted may be suspended from a travelling line and dipped into and removed from the bath, while making contact with the positive pole of a D.C. source, in a manner known per se. After leaving the bath the articles may be washed, preferably with deionised water, to remove any adherent liquid paint composition, and stoved as required by the particular binder employed. These operations also may be carried out on a continuous basis.

The stoved article may be the final product, or it may be used as the base for a further coating operation. Thus, provided the proportion of metal in the coating is sufficient, the stoving will result in the formation of a conducting layer. Generally metal:binder weight ratios (in the coating) of about 45:55 and higher will enable a conducting layer to be formed in this way. A further layer of zinc, or a layer of another metal e.g. chromium or silver, may be deposited electrolytically on the "painted" article, the resulting composite layer then combining the good mechanical and protective properties of the initial paint layer with the smooth and bright appearance of the electrolytically deposited surface layer.

The painted surface may also form the base on which a non-metallic coating is deposited electrophoretically or otherwise. Such coatings are based on water-soluble or water-dispersible resins such as have already been described, and may contain various non-conducting or high resistance pigments such for example as titanium dioxide, zinc oxide, china clay or barytes to give body, and if desired suitable dyes or other colouring matter; alternatively a coloured pigment can be used.

The following examples illustrate the invention.

EXAMPLE 1

A paint formulation was made up as follows:

| | Parts |
|---|---|
| Zinc flake paste [1] | 6.0 |
| Water-soluble resin [2] (60% solids) | 5.4 |
| Wetting agent (sulphated long chain fatty alcohol) | 0.08 |
| Suspending agent (ethyl hydroxyethyl cellulose) | 0.08 |
| n-Butanol | 1.04 |
| Triethylamine | 0.20 |
| Deionised water | 87.2 |
| | 100.00 |

[1] Zinc flake 84%; stearic acid 3%; white spirit 13%.
[2] Modified phenolic alkyd resin.
The pigment:binder ratio was 60:40.

The zinc flake paste, binder, wetting agent, dispersing agent and n-butanol were worked together on a triple roll mill and the water added gradually, finally the pH was adjusted by adding the triethylamine.

Steel sheets were used as the anodes in a standard constant voltage electro-depositing device, the applied voltage being 80 volts, and the treatment time 1 minute.

After being removed from the bath, the steel sheets were washed with a jet of deionised water, and stoved at 120° C. for about 30 minutes. They had an appearance similar to that of similar sheets which had been given a coating of a zinc paint by spraying or dipping, but the coating of zinc paint on the former sheets was exceptionally uniform; its thickness was of the order of 25 microns.

EXAMPLE 2

The paint formulation was:

| | Parts |
|---|---|
| Zinc flake paste [1] | 46 |
| Water-soluble resin [2] | 46 |
| Non-ionic surfactant | 1 |
| White spirit | 7 |

[1] Zinc 84%; surface area 1.15 m.²/g.; stearic acid 3%; white spirit 13%.
[2] Water-soluble phenolic modified alkyd resin as WPR 264.

The zinc flake, surfactant and white spirit were thoroughly dispersed by high speed stirring, after which the resin and 20 parts of de-ionised water were added and the whole passed through a colloid mill, and then diluted with further deionised water to a solids content of 10% with high speed stirring.

Steel plates were coated electrophoretically under constant voltage conditions using a voltage of 80 volts for one minute, after which they were stoved at 120° C. for 20 minutes. A satisfactory coating containing about equal parts of zinc and binder, and free from agglomerates, was obtained.

EXAMPLE 3

The formulation was as follows:

| | Parts |
|---|---|
| Zinc flake paste (as in Example 2) | 45 |
| Water-soluble resin (as in Example 2) | 40 |
| Titanium dioxide (coated rutile)[1] | 7 |
| White spirit | 7 |
| Surfactant (as in Example 2) | 1 |

[1] "Rutile RCR."

The method of making the aqueous suspension was essentially as in Example 2, except that the resin and extender (titanium dioxide) were added to the pre-dispersion, and the resulting mixture was further dispersed before adding the 20 parts of de-ionised water. The product was passed twice through a colloid mill before the final dilution.

Electro-deposition was carried out at three different voltages, and the coatings obtained differed in their zinc content as follows:

| Voltage: | Zinc content, percent |
|---|---|
| 20 | 48.7 |
| 30 | 46.4 |
| 40 | 42.3 |

Satisfactory coatings of zinc, titanium and binder were obtained.

At higher voltages the zinc content of the coating was lower as shown in the following table.

| Voltage: | Zinc content, percent |
|---|---|
| 50 | 37.3 |
| 60 | 36.0 |
| 100 | 26.3 |
| 120 | 21.0 |

Since the titanium content of the coating increased as the zinc content fell, coatings obtained at the higher voltages are useful for many purposes.

EXAMPLE 4

The formulation was:

| | Parts |
|---|---|
| Zinc flake paste (as in Example 2) | 45 |
| Water-soluble resin (as in Example 2) | 40 |
| Titanium dioxide (coated rutile as in Example 3) | 7 |
| Dispersing medium ("Kromosperse")[1] | 7 |
| Non-ionic surfactant (as in Example 2) | 1 |

[1] A mixture of resins and wetting agent, soluble in organic and aqueous media, with a diluent which makes up 30% of the whole.

The aqueous suspension was made as in Example 3, the dispersing medium being incorporated in the pre-dispersion first formed.

It was electro-deposited on steel sheet at 35 volts for 2 minutes, and the sheet was stoved at 120° C. for 1 hour. The resulting coating had a zinc content of 55% and was 12 microns thick.

In a modification of this process 2 parts of a water-soluble melamine-formaldehyde anionic resin (L2884) was added, allowing the stoving time to be reduced to 25 minutes at 130° C. and giving a product similar to that described above.

EXAMPLE 5

The following formulation was used:

| | Parts |
|---|---|
| Zinc flake paste (as in Example 2) | 37 |
| Aluminium flake paste (water-dispersible, 65% solids) | 12 |
| Non-ionic surfactant (as in Example 2) | 2 |
| "Binder S" [1] | 49 |

[1] Water-soluble epoxy ester of a fatty acid; solids 50%, monoethylether of ethylene glycol 17%, water 35%. See Korf, Sneldersvaard and Beljaade, VIII Congres Fatipec (1966) page 116.

The zinc and aluminium flakes were intimately mixed, and the surfactant and 10 parts of de-ionised water were added. After pre-dispersion as in Example 2 the binder was added, and the mixture passed through a colloid mill and diluted to a solids content of 10%. At this stage the dispersion had a pH of 10, compared with the pH of 7 of the paints of the previous examples. By electro-deposition as in Example 2 a coating was obtained having a metal content of about 50%.

EXAMPLE 6

The formulation was:

| | Parts |
|---|---|
| Zinc flake paste (as in Example 2, but substituting lauric for stearic acid) | 55 |
| Water-soluble resin (as in Example 2) | 44 |
| Surfactant (as in Example 2) | 1 |

The whole was dispersed for 1½ hours with high speed stirring; 25 parts of de-ionised water were added, and the resulting mixture passed twice through a colloid mill and then diluted with de-ionised water to a solids content of 10% with high speed stirring.

This flake had a rather larger particle size than that used in Example 2. This increased the tendency to settle, but even so paint films containing 50% of zinc and 25 microns thick were obtained by electro-deposition at 80 volts followed by stoving at 120° C. for 20 minutes.

EXAMPLE 7

Substrates carrying a coating of zinc were obtained as described in Examples 2 and 4 respectively. Each was then given a coating of a non-metallic composition, using a paint of the following formulation:

| | Parts |
|---|---|
| Titanium dioxide (coated rutile as in Example 3) | 29 |
| Monastral Fast Blue BGS | 4 |
| Surfactant (as in Example 2) | 1 |
| n-Butanol | 7 |
| Water-soluble resin (as in Example 2) | 59 |

These components were milled together on a triple roll mill, and the mixture diluted to a solids content of 10% with de-ionised water.

The electro-deposition was effected at 140 volts for 1 minute, giving a satisfactory paint film of total thickness, 35 microns (i.e. zinc coating 15 microns, top coating 20 microns).

Substantially the same results were obtained with both substrates.

We claim:

1. Process for forming a coating of a zinc paint on a metal substrate by electro-deposition, which comprises immersing the substrate in an aqueous suspension of zinc flake of particle size below 60 microns, in which the zinc particles carry a protective coating of a water-insoluble material which is at least largely non-polar, the said suspension containing also a water-dispersible resin as binder; passing an electric current through the said aqueous suspension using the substrate as the anode; and stoving the resulting coated substrate to insolubilise the binder.

2. Process according to claim 1, in which the zinc flake has a specific surface area of 0.5–3.3 sq. metres/gram.

3. Process according to claim 1, in which the aqueous suspension contains also aluminium flake of particle size below 150 microns in which the aluminium particles carry a protective coating of a water-insoluble material which is at least largely non-polar.

4. Process according to claim 1, in which the zinc particles carry a protective coating of a fatty acid of formula $C_nH_{2n+1}COOH$ in which $n$ is at least 12.

5. Process according to claim 3, in which the zinc particles carry a protective coating of a fatty acid of formula $C_nH_{2n+1}COOH$ in which $n$ is at least 12.

6. Process according to claim 1, in which the binder is selected from the group which consists of water-soluble modified alkyd resins and aminoplasts, water-soluble epoxy resins, and water-soluble epoxy esters of fatty acids.

7. Process according to claim 1, in which the weight ratio metal:binder in the aqueous suspension is between 1:1 and 3:1.

8. Process according to claim 1, in which the pre-dispersion of the zinc pigment in a dispersing medium containing a non-ionic surfactant is first produced and the binder and water are subsequently mixed with the pre-dispersion.

9. Process according to claim 3, in which a pre-dispersion of the zinc and aluminium pigments in a dispersing medium containing a non-ionic surfactant is first produced and the binder and water are subsequently mixed with the pre-dispersion.

10. Process according to claim 8, in which the said dispersing medium consists of at least one liquid hydrocarbon.

11. Process according to claim 8, in which the weight ratio metal:dispersing medium in the pre-dispersion is between 3:1 and 1:1.

12. Process according to claim 1, in which the aqueous suspension contains also a high-resistance pigment as an extender.

13. Process according to claim 12, in which the extender is coated rutile.

14. Process according to claim 12, in which the proportion of extender in the aqueous suspension is 5–15% of the total weight of metal flake, binder and extender.

15. Process according to claim 1, in which the electro-desposition is effected at a voltage of 50–80 volts.

16. Process according to claim 12, in which the electro-disposition is effected at a voltage of 15–40 volts.

17. Process according to claim 1, in which the coating is formed on a ferrous metal substrate.

18. Process according to claim 1, in which after sufficient zinc has been deposited on the substrate to form a coating which is sufficiently continuous to render it conducting and the coated substrate has been stoved, a metal is deposited electrolytically thereon.

19. Process according to claim 18, in which zinc is deposited electrolytically on the coated substrate.

20. Process according to claim 1, in which after the stoving, a coating comprising a high resistance pigment and a binder is deposited electrophoretically on the coated substrate.

References Cited

UNITED STATES PATENTS

| | | | |
|---|---|---|---|
| 2,215,167 | 9/1940 | Sumner et al. | 204—181 |
| 2,650,975 | 9/1953 | Dorst | 204—181 |
| 2,894,888 | 7/1959 | Shyne et al. | 204—181 |
| 2,982,707 | 5/1961 | Scheible | 204—181 |
| 3,067,120 | 12/1962 | Pearlstein | 204—181 |

FOREIGN PATENTS

| | | |
|---|---|---|
| 645,044 | 7/1962 | Canada. |
| 251,979 | 4/1926 | Great Britain. |
| 505,709 | 5/1939 | Great Britain. |

OTHER REFERENCES

Pearlstein et al. "Electrophoretic Deposition of Metals," Journal of Electrochemical Society, vol. 110, No. 7, July 1963, pp. 843–845.

JOHN H. MACK, Primary Examiner

E. ZAGARELLA, JR., Assistant Examiner

U.S. Cl. X.R.

204—38